July 31, 1928.  
R. B. FAGEOL  
BUMPER TIP  
Filed June 10, 1925

INVENTOR.  
Rollie B. Fageol.

BY  
Dewey, Strong, Townsend & Loftus  
ATTORNEYS.

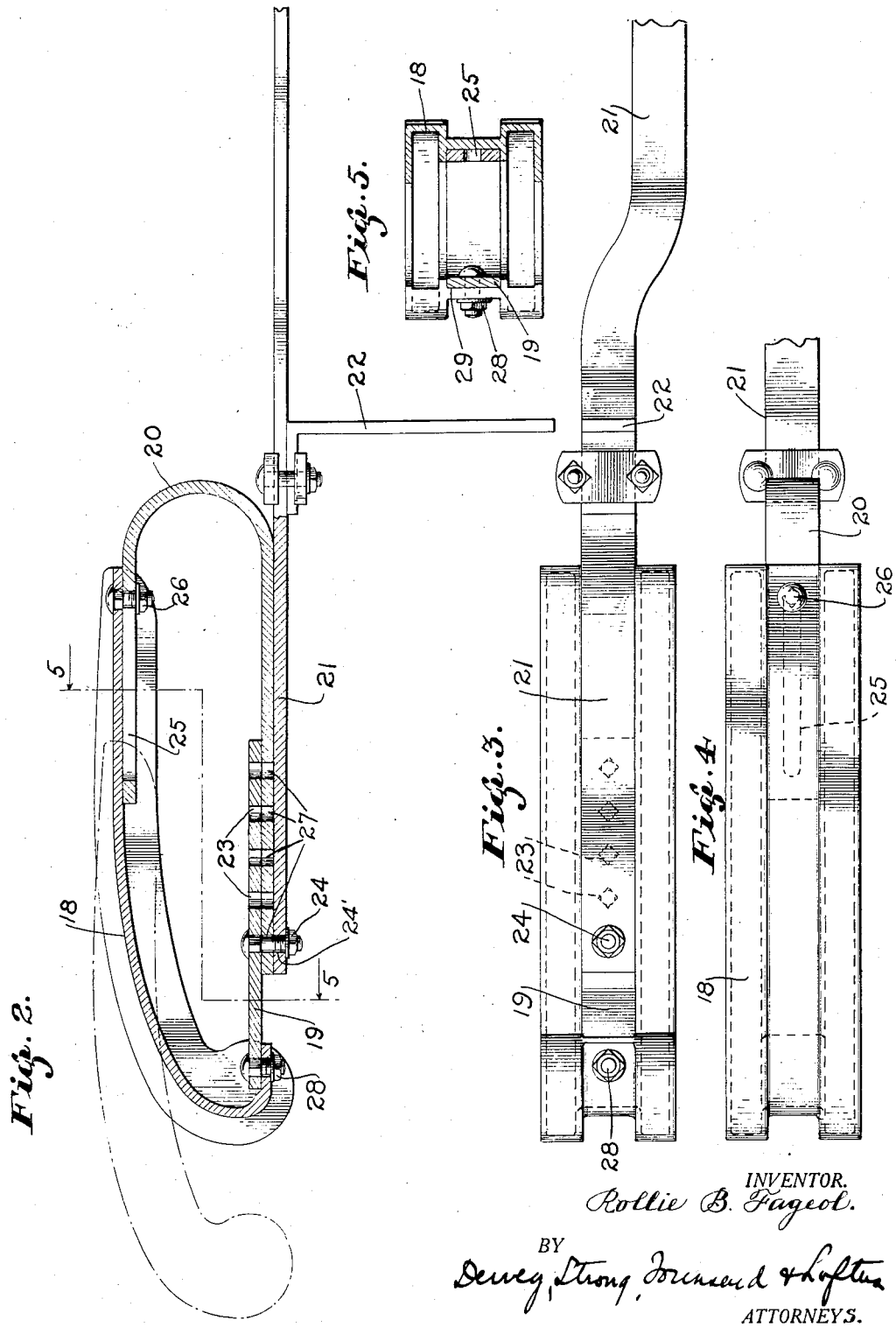

Patented July 31, 1928.

1,678,853

UNITED STATES PATENT OFFICE.

ROLLIE B. FAGEOL, OF LOS ANGELES, CALIFORNIA, ASSIGNOR TO AMERICAN CHAIN COMPANY, INC., OF BRIDGEPORT, CONNECTICUT, A CORPORATION OF NEW YORK.

BUMPER TIP.

Application filed June 10, 1925. Serial No. 36,099.

This invention relates to automobile bumpers and particularly pertains to bumper tips.

Due to the fact that it is common practice to mount spare automobile tires across the rear of an automobile body, it is not necessary to equip the rear of the automobile with a completely transversely extending bumper, since the tire protects the center of the vehicle and it is only necessary, therefore, to provide means for protecting the rear wheel fenders. This has been done by the use of bumper side wings or bumper tips which are carried by the frame and extend horizontally from the sides thereof to overhang the rear fenders. In practice, however, it is found that the dimensions of the automobile bodies vary, as well as the widths of the rear fenders. This makes it imperative to design bumper tips of correspondingly varying lengths to adequately protect the rear of different makes of automobiles, and it is the principal object of the present invention to provide a bumper tip embodying adjustable means whereby one set of bumper tips may be readily mounted on a variety of makes of cars.

The present invention contemplates the provision of a bumper impact member resiliently supported and adjustably mounted from the vehicle frame.

The invention is illustrated by way of example in the accompanying drawings, in which:

Fig. 2 is an enlarged view in horizontal section through one of the bumper tips showing the details of its construction and the manner in which its adjustability is obtained.

Fig. 3 is a view in elevation showing one of the bumper tips as viewed from the rear and disclosing the relation of parts.

Fig. 4 is a view in elevation showing the bumper tip disclosed in Fig. 3 showing its impact face.

Fig. 5 is a view in transverse section through the bumper tip seen on the line 5—5 of Fig. 2.

Figure 1:
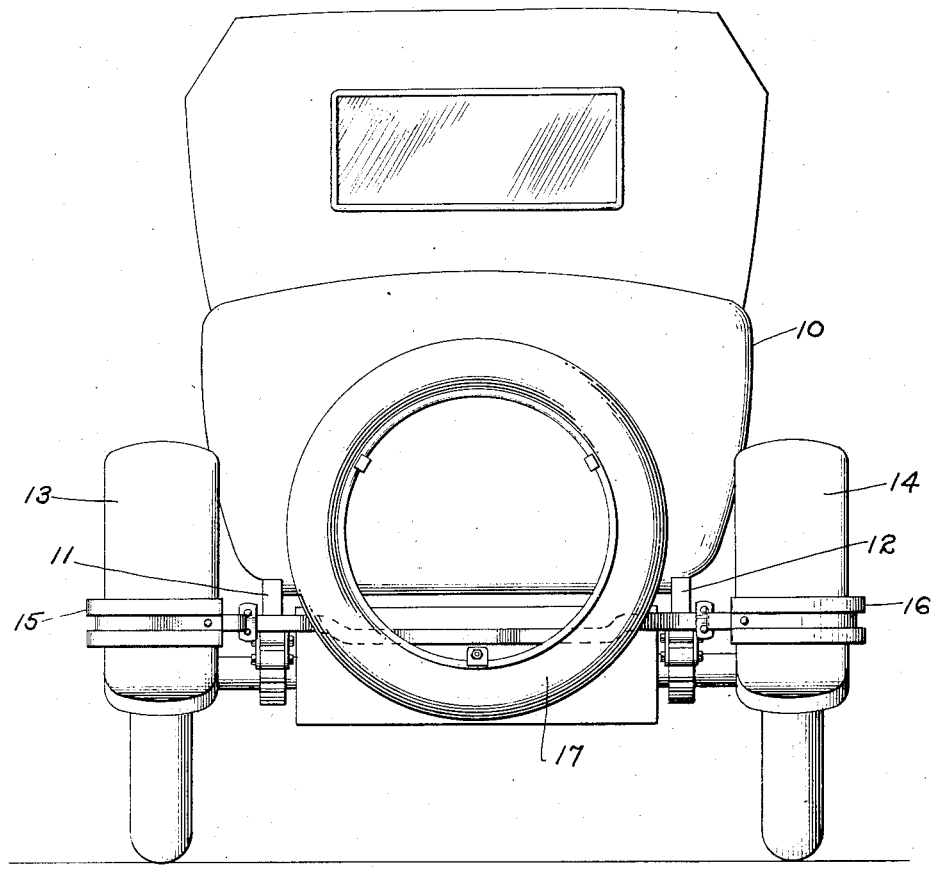
Fig. 1 is a view in rear elevation showing the automobile with the present invention applied thereto and further disclosing the relation of the bumper tips to a spare tire carried by the automobile.

Referring more particularly to the drawings, 10 indicates an automobile body supported on parallel main frame members 11 and 12. Carried by the automobile body are rear wheel fenders 13 and 14 which overhang the sides of the vehicle. Mounted upon the frame members 11 and 12 are bumper tips 15 and 16 with which the present invention is particularly concerned. These tips are also arranged on opposite sides of a tire 17 or luggage rack, which it is customary to mount on the rear of the automobile. The bumper tips are more clearly shown in Figs. 2 to 5 inclusive of the drawings, where it will be seen that they comprise an impact member 18 mounted on supporting bars 19 and 20. The bar 19 extends horizontally and transversely of the vehicle main frame and is supported on a transversely extending bar 21. This bar may extend entirely across the rear of the automobile to afford support for both of the bumper tips, or it may terminate adjacent to or be formed integral with the mounting arm 22 by which the tip is directly mounted upon the vehicle frame. The supporting bar 19 is formed with a plurality of perforations 23 to receive a bolt 24 by which the bar is rigidly fastened in an adjustable manner to the transverse bar 21.

The supporting bar 20 is bent upon itself to form a U shaped loop, the two arms of which extend parallel and outwardly in a horizontal plane. The outer of said arms is formed with a slot 25 to receive a bolt 26. The inner of said arms lies flat against the outer flat face of the connecting bar 21 and is formed with a plurality of perforations 23 through which the lock bolt 24 may be passed.

The end of the arm formed with the openings 27 is interposed between the supporting bar 19 and the cross bar 21, as clearly shown in Fig. 2 so that when the bolt 24 is tightened it will rigidly grip the cross bar 21, the looped supporting bar 20, and the straight supporting bar 19. The outer end of the bar 19 is fastened to the impact member 18 by a bolt 28. The impact member 18 may be of any desired configuration, but it is here shown as being of pressed metal forming a substantially flat rear face and a curved end by which objects may be warded off.

By reference to Fig, 5, it will be seen that the inner face of the impact bar is formed with a horizontally extending channel 29 into which the supporting bars 19 and 20 project and by which said bars together with the impact bar are maintained in aligned positions while being clamped together by the bolts 26 and 28. By this arrangement, it will be evident that the position of the impact member 18 may be shifted horizontally by removing the bolt 24 and then moving the complete bumped tip horizontally until another pair of holes 23 and 27 are in register with the hole 24' of the connecting bar 21. If, however, it is desired to increase the length of the bumper tip, this may be done by loosening bolt 26, thereafter removing bolt 24 and shifting the impact member horizontally so that another of the holes 23 will register with the hole 24' for receiving the bolt 24.

In either event, it will be evident that the bumper tip structure provides a suitable impact member yieldably supported by the looped support 20 and the overlapping supporting bar 19, and that in addition the bumper tips may be readily adapted for use upon cars of various makes, designs and dimensions.

While I have shown the preferred form of my invention as now known to me, it is to be understood that various changes may be made in its construction without departing from the spirit of the invention as defined in the appended claims.

Having thus described my invention, what I claim and desire to secure by Letters Patent is:

1. A bumper structure comprising a horizontally extending supporting member, means for mounting said member transversely of the end of an automobile frame, and a pair of bumper tips supported by the opposite ends of said horizontal supporting bar, said tips comprising an impact member disposed in the rear of said horizontal bar, and looped resilient means supporting said impact member upon the bar, and means whereby the bumper tips may be moved horizontally relative to the supporting bar and with relation to each other.

2. A bumper structure comprising a horizontally extending supporting member, means for mounting said member transversely of the end of an automobile frame, and a pair of bumper tips supported by the opposite ends of said horizontal supporting bar, said tips comprising an impact member disposed in the rear of said horizontal bar, resilient means supporting said impact member upon the bar, means whereby the bumper tips may be moved horizontally relative to the supporting bar and with relation to each other, and means for adjustably varying the lengths of the bumper tips.

3. A bumper tip for automobiles comprising an impact member disposed transversely of an automobile frame and overhanging the sides thereof to protect the fender, mounting means carried by the vehicle frame, separate and looped resilient means supporting said impact member upon the mounting means and in substantially the same horizontal plane therewith.

4. A bumper tip for automobiles comprising a non-resilient impact member disposed transversely of an automobile frame and overhanging the sides thereof to protect the fender, mounting means carried by the vehicle frame, looped resilient means supporting said impact member upon the mounting means and in substantially the same horizontal plane therewith, and means for supporting said bumper structure on said mounting for horizontal adjustment.

5. A bumper tip structure for automobiles comprising an impact member disposed horizontally of an automobile frame and extending outwardly to overhang the sides thereof and protect an automobile fender, mounting means therefore carried by the frame, an intermediate looped resilient supporting member by which the impact member is secured to the mounting means and means for permitting lateral horizontal movement and adjustment of the impact member with relation to its support.

ROLLIE B. FAGEOL